US010878148B2

(12) United States Patent
Lin

(10) Patent No.: US 10,878,148 B2
(45) Date of Patent: Dec. 29, 2020

(54) VARIABLE SIGNAL FLOW CONTROL METHOD FOR REALIZING CHIP REUSE AND COMMUNICATION TERMINAL

(71) Applicant: VANCHIP (TIANJIN) TECHNOLOGY CO., LTD., Tianjin (CN)

(72) Inventor: Sheng Lin, Tianjin (CN)

(73) Assignee: VANCHIP (TIANJIN) TECHNOLOGY CO., LTD., Tianjin (CN)

( * ) Notice: Subject to any disclaimer, the term of this patent is extended or adjusted under 35 U.S.C. 154(b) by 76 days.

(21) Appl. No.: 16/313,814

(22) PCT Filed: Jun. 30, 2017

(86) PCT No.: PCT/CN2017/091337
§ 371 (c)(1),
(2) Date: Dec. 27, 2018

(87) PCT Pub. No.: WO2018/001377
PCT Pub. Date: Jan. 4, 2018

(65) Prior Publication Data
US 2019/0155782 A1      May 23, 2019

(30) Foreign Application Priority Data

Jun. 30, 2016   (CN) .......................... 2016 1 0507221

(51) Int. Cl.
*G06F 17/50*       (2006.01)
*G06F 30/30*       (2020.01)
(Continued)

(52) U.S. Cl.
CPC .............. *G06F 30/30* (2020.01); *G06F 30/34* (2020.01); *H05K 3/0005* (2013.01);
(Continued)

(58) Field of Classification Search
None
See application file for complete search history.

(56) References Cited

U.S. PATENT DOCUMENTS 4,703,483 A * 10/1987 Enomoto ........... G01R 31/2853
257/E25.013
5,366,906 A * 11/1994 Wojnarowski ...... H01L 23/5389
438/17
(Continued)

FOREIGN PATENT DOCUMENTS

CN            1469451 A       1/2004
CN          101136005 A       3/2008
(Continued)

OTHER PUBLICATIONS

International Search Report in the international application No. PCT/CN2017/091337, dated Oct. 12, 2017.
(Continued)

*Primary Examiner* — Leigh M Garbowski
(74) *Attorney, Agent, or Firm* — Ladas & Parry, LLP

(57) ABSTRACT

A variable signal flow control method for realizing chip reuse and a communication terminal for realizing chip reuse using the variable signal flow control method, the method comprises the following steps: using at least two identical integrated circuit (IC) chips, the respective IC chips achieving different flows of the control signals according to different logic control signals; controlling the logic control signals such that the respective IC chips achieves the flow of the corresponding control signals. The method can achieve control function of different signal flows for two identical IC chips, thereby greatly simplifying chip types for achieving IC system functions, greatly reducing development costs of the IC system and management complexity of the mass production supply chain.

12 Claims, 5 Drawing Sheets

(51) Int. Cl.
*G06F 30/34* (2020.01)
*H05K 3/00* (2006.01)
*G06F 115/02* (2020.01)
*G06F 115/12* (2020.01)
*G06F 113/18* (2020.01)
*G06F 119/20* (2020.01)

(52) U.S. Cl.
CPC ...... *G06F 2113/18* (2020.01); *G06F 2115/02* (2020.01); *G06F 2115/12* (2020.01); *G06F 2119/20* (2020.01); *H05K 2203/049* (2013.01)

(56) References Cited

U.S. PATENT DOCUMENTS

| | | | |
|---|---|---|---|
| 5,777,529 | A | 7/1998 | Lowe |
| 6,977,440 | B2 * | 12/2005 | Pflughaupt ............. H01L 23/50 257/777 |
| 9,432,298 | B1 * | 8/2016 | Smith ................. H04L 49/9057 |
| 9,443,187 | B2 * | 9/2016 | Ozaki ................ G06K 19/0717 |
| 9,652,702 | B2 * | 5/2017 | Fujimoto ............. G06K 15/408 |
| 9,739,850 | B2 * | 8/2017 | Bai ........................ H03K 17/97 |
| 10,320,385 | B2 * | 6/2019 | Lin .................... H03K 19/0002 |
| 2009/0057914 | A1 * | 3/2009 | McDonald-Maier ....................... H01L 25/0657 257/777 |
| 2010/0011265 | A1 * | 1/2010 | Tamura ............... G06F 13/4022 714/734 |
| 2013/0151829 | A1 * | 6/2013 | Amann ................. G06F 9/4401 713/2 |

FOREIGN PATENT DOCUMENTS

| | | |
|---|---|---|
| CN | 102789436 A | 11/2012 |
| CN | 103904893 A | 7/2014 |
| CN | 104202631 A | 12/2014 |
| CN | 105629811 A | 6/2016 |
| EP | 2757675 A2 | 7/2014 |
| WO | 2013024463 A2 | 2/2013 |

OTHER PUBLICATIONS

Written Opinion of the International Searching Authority in the international application No. PCT/CN2017/091337 dated Oct. 11, 2017.
First Office Action issued in Chinese Application No. 201610507221.7, dated Jun. 28, 2019.
First Search Report issued in Chinese Application No. 201610507221.7, dated Jun. 19, 2019.

* cited by examiner

VARIABLE SIGNAL FLOW CONTROL METHOD FOR REALIZING CHIP REUSE AND COMMUNICATION TERMINAL

CROSS-REFERENCE TO RELATED APPLICATIONS

The present application is the U.S. national phase of PCT Application PCT/CN2017/091337 filed on Jun. 30, 2017, which claims priority to the Chinese patent application No, 201610507221.7 filed on Jun. 30, 2016, the entire disclosures of which are hereby incorporated by reference in their entireties.

BACKGROUND

Technical Field

The present invention relates to a variable signal flow control method for realizing chip reuse and a communications terminal for realizing chip reuse by using the variable signal flow control method, and belongs to the field of integrated circuit technologies.

Related Art

For electronic products, the pursuit of small size, multi-function, low costs, and low power consumption never ends. Because of this, process improvement and system integration become two development tendencies of the semiconductor industry. Currently, the wafer manufacturing industry emphasizing process improvement still develops according to the Moore's Law. However, as a process size is further decreased, the Moore's Law is gradually reaching its limit.

System integration is an important technical means for the semiconductor industry to transcend the Moore's Law. Currently, the system integration has three mainstream technologies, system in packaging (SiP), system on chip (SoC), and three-dimensional integrated circuit (3DIC). The SiP technology integrates a plurality of chips with different functions and different processes, some passive elements, and antennas into one package body, to form a three-dimensional multi-layer complex system having powerful system functions. Compared with the SoC technology and the 3DIC technology, the SiP technology has advantages such as high integration, good process compatibility, low costs, and high reliability, and has bright application future and a huge market demand.

With an increase of requirements of electronic device miniaturization and function diversification, it is required that system-level integration be constantly improved. Therefore, the quantity of chips required to develop an integrated circuit system also becomes larger. Development costs of integrated circuit systems become higher due to excessively high costs of chips put into production (where main costs come from illumination plate manufacturing). In the integrated circuit system, some functions are usually similar to other functions. If these similar functions can be implemented by using a chip sharing method, the quantity of different chips put into production can be greatly reduced, thereby resolving the problem of high costs of developing the integrated circuit system.

In a process of manufacturing a communications terminal, a radio frequency front module includes all elements between a transceiver output and an antenna, and is an important part of system in packaging. A miniaturized radio frequency front module can greatly improve integration and reliability of the system in packaging. Therefore, miniaturization of the radio frequency front module has become a research hotspot in recent years. Miniaturization of the radio frequency front module has two development tendencies, that is, a component-reusable technology and an active-inductor technology. The component-reusable technology means that in a multi-mode/multi-band chip, a plurality of transceivers shares an ultra-broadband low-noise amplifier or an ultra-broadband tuning-range oscillator, a phase-locked loop, and the like. For example, Peregrine, the American semiconductor company, has developed a reconfigurable radio frequency front module UltraCMOS Global which can resolve a problem of mutual operations through high isolation between low-loss switching and tuning, and be adaptable to all modes and bands in a digital control manner. However, the existing component-reusable technology still has many defects such as a limited application range and poor anti-interference performance that are tough to improve.

SUMMARY

A primary technical problem to be resolved in the present invention is to provide a variable signal flow control method for realizing chip reuse.

Another technical problem to be resolved in the present invention is to provide a communications terminal for realizing chip reuse by using the variable signal flow control method.

To achieve the foregoing inventive objectives, the following technical solutions are used in the present invention:

According to a first aspect of embodiments of the present invention, a variable signal flow control method for realizing chip reuse is provided. The variable signal flow control method for realizing chip reuse includes the following steps:

using at least two identical integrated circuit chips, where the integrated circuit chips achieve different flows of control signals according to different logic control signals; and controlling the logic control signals, so that the integrated circuit chips respectively achieve flows of corresponding control signals.

Preferably, the integrated circuit chip is any of a radio frequency switch chip, a radio frequency amplifier chip, a power management chip, and a power control chip.

Preferably, when the integrated circuit chip is packaged, the logic control signals are connected to a power terminal or a ground terminal of the integrated circuit chip by wire bonding.

Preferably, the integrated circuit chip has at least two groups of transmission ports of the control signals; when the logic control signals are connected to the power terminal, a first group of transmission ports are used as input ports, and a second group of transmission ports are used as output ports; and when the logic control signals are connected to the ground terminal, the first group of transmission ports are used as output ports, and the second group of transmission ports are used as input ports.

Preferably, when the at least two integrated circuit chips are connected in series level by level, the logic control signals are controlled, so that the control signals are output from an output port of a previous-level integrated circuit chip to an input port of a next-level integrated circuit chip.

Preferably, the previous-level integrated circuit chip transmits the received control signals to the output port by using a cable inside a chip, and transfers the received control signals to the next-level integrated circuit chip by wire bonding.

Preferably, there are two integrated circuit chips, the integrated circuit chip receiving the control signals first is a first receiver chip, and the integrated circuit chip receiving the control signals later is a second receiver chip; and the first receiver chip transmits the received control signals to an input port of the second receiver chip.

Preferably, the logic control signals are controlled, so that the integrated circuit chips respectively execute a function of the first receiver chip and a function of the second receiver chip.

Preferably, in the integrated circuit chip, an input end of the logic control signals is pulled up to a power terminal by using a resistor, and a pin of the logic control signals is unconnected; or in the integrated circuit chip, an input end of the logic control signals is pulled down to a ground terminal by using a resistor, and a pin of the logic control signals is unconnected.

Preferably, the resistor is a passive thin-film resistor or a transistor in a proper biased state.

According to a second aspect of the embodiments of the present invention, a communications terminal is provided. In the communications terminal, at least two identical integrated circuit chips are used, and different flows of control signals are achieved by using the foregoing variable signal flow control method.

Compared with the prior art, in the variable signal flow control method provided in the present invention, configuration functions of different input ports and output ports are implemented by using two completely identical integrated circuit chips, thereby further implementing a function of controlling different signal flows. By using the present invention, application flexibility of integrated circuit chips is improved, categories of chips for implementing functions of an integrated circuit system are effectively simplified, and development costs of the integrated circuit system and management complexity of a mass production supply chain are greatly reduced.

DETAILED DESCRIPTION

Technical content of the present invention is specifically described below in detail with reference to the accompanying drawings and specific embodiments.

First, it should be noted that in various embodiments of the present invention, a communications terminal may refer to computer devices that can be used in a mobile environment and support a plurality of communication standards such as GSM, EDGE, TD-SCDMA, TDD-LTE, and FDD-LTE. The computer devices include, but are not limited to, mobile phones, notebook computers, tablet computers, and vehicle-mounted computers.

Currently, system complexity of a radio frequency front module in a communications terminal is constantly increased, resulting in high corresponding development costs. Because the radio frequency front module has an increasingly high integration requirement, more chips need to be laid out on a smaller substrate, to satisfy a product requirement on constant miniaturization. Therefore, a higher requirement is imposed on a substrate-level design layout, because both a requirement on a module pin definition proposed by a system vendor and a design requirement on performance indicators such as connections and matching between multiple chips need to be satisfied.

Therefore, the inventor considers designing some chips into input interfaces and output interfaces in a flexible changeable manner. In this way, the flexibility of chip arrangement in a substrate-level design will be greatly improved. However, because at an initial stage of a design, directions of some signal flows usually cannot be completely determined. Through the changeable design of an input interface and an output interface on a chip, high costs can be avoided. The high costs come from illumination plate manufacturing and are caused because the entire chip needs to be re-produced by light exposure and masking since a change in a substrate-level design requires an opposite direction of a signal flow.

To obviously reduce the development costs of an integrated circuit system, the present invention first provides a specially designed variable signal flow control method, to achieve a technical effect that two completely identical chips generate two completely different signal flows when a same chip is shared an additional logic control signal is introduced, thereby reducing the development and production costs of one of the chips. With reference to different the embodiments, detailed descriptions are given.

Embodiment 1

Figure 1:
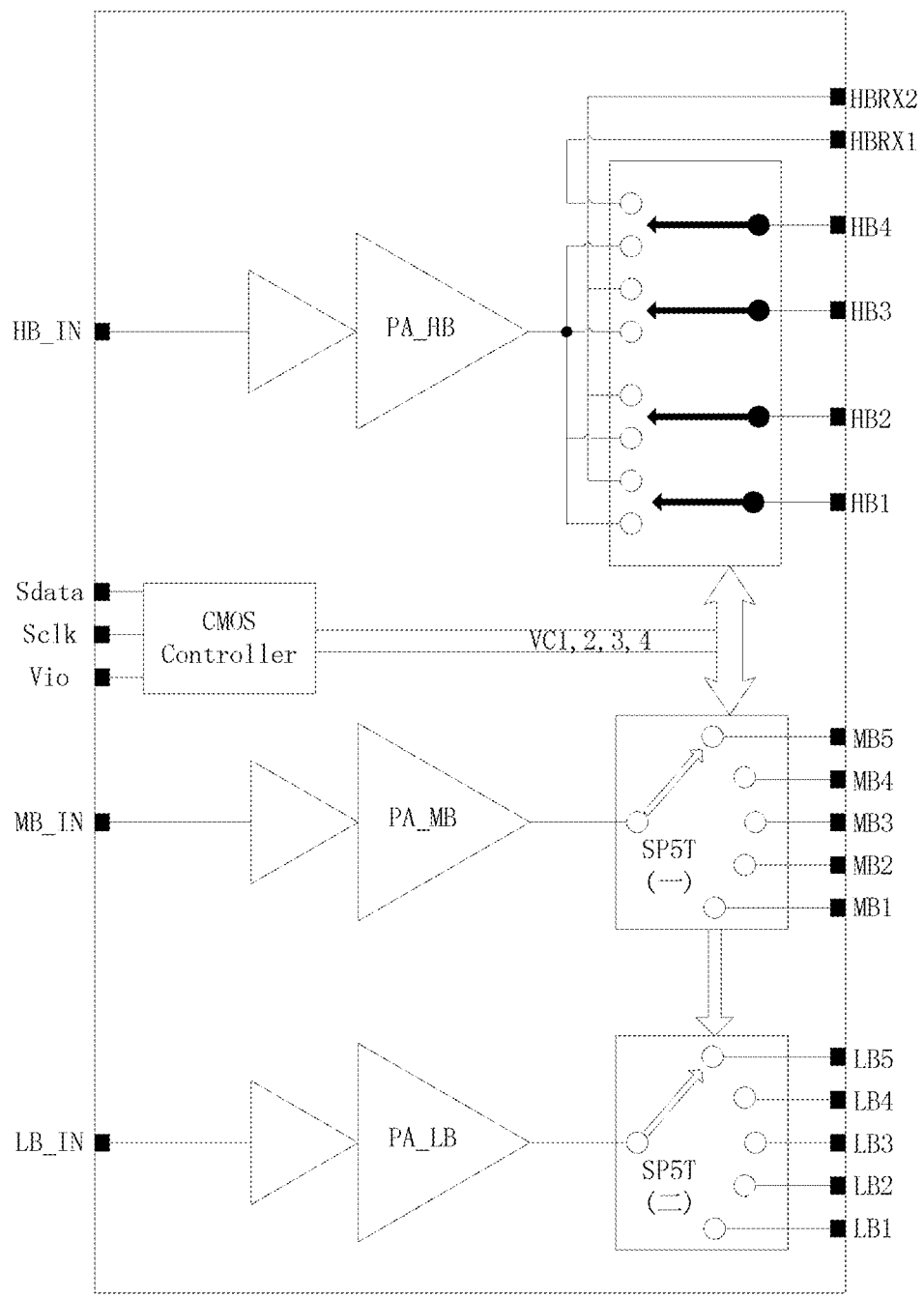
FIG. 1 is a system block diagram of a radio frequency power amplifier and a radio frequency switch chip that are used in a communications terminal.

FIG. 1 is a system block diagram of a radio frequency power amplifier (PA) and a radio frequency (RF) switch chip that are used in a communications terminal. Two single-pole five-throw (SP5T) radio frequency switch chips are used in a radio frequency front module. Their working principles are completely identical. Control signals (or another type of signal such as a data signal) from an integrated circuit system or a control chip is denoted as VCX, and the control signals need to be transferred to a plurality of subsequent radio frequency switch chips. A method commonly used in the prior art is to perform cabling on a substrate. However, this occupies the limited substrate area and causes unpredictable problems such as signaling coupling and interference.

Figure 2:
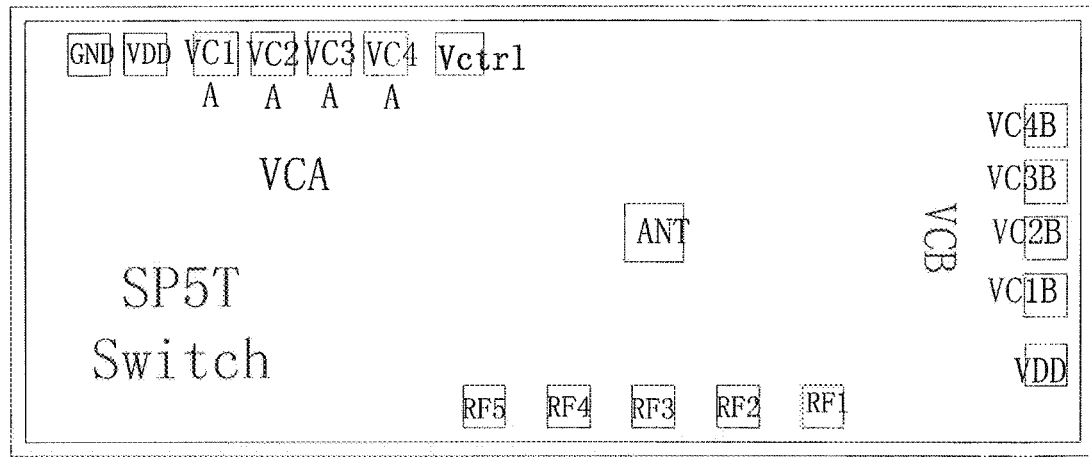
FIG. 2 is an exemplary layout diagram of Embodiment 1 according to the present invention.

As shown in FIG. 2, to fundamentally resolve the foregoing problems, a new logic control signal Vctrl is introduced in the present invention. The logic control signal is not provided by an integrated circuit system. Instead, in chip packaging shown in FIG. 1, the logic control signal Vctrl is connected to a power terminal (a VDD terminal) or a ground terminal (a GND terminal) by wire bonding as required by a substrate-level design on a control signal flow, to configure the radio frequency switch chip into the control signal flow as required by the integrated circuit system. The foregoing packaging may be wire bonding packaging, or may be flip chip packaging, or may be various other packaging manners such as wafer-level chip scale packaging, which are not listed one by one herein.

Specifically, two groups of transmission ports VCXA and VCXB of control signals are introduced, where "X" represents a positive integer from 1 to 4. Input features and output features of VCXA and VCXB are determined by the logic control signal Vctrl. By means of a proper circuit design, when the logic control signal Vctrl is connected to the power terminal (the VDD terminal), VCXA are used as input ports, and VCXB are used as output ports; when the logic control signal Vctrl is connected to the ground terminal (the GND terminal), VCXA are used as output ports, and VCXB are used as input ports. In this way, the requirements on different flows of the control signals are satisfied by using a same radio frequency switch chip. The substrate may change the control signal flow through a configuration of the logic control signal Vctrl, thereby realizing chip reuse, and fundamentally saving development costs of another radio frequency switch chip. Further, management of a mass production supply chain of the radio frequency front module is simplified, thereby further reducing the development costs of the entire integrated circuit system.

Figure 3:
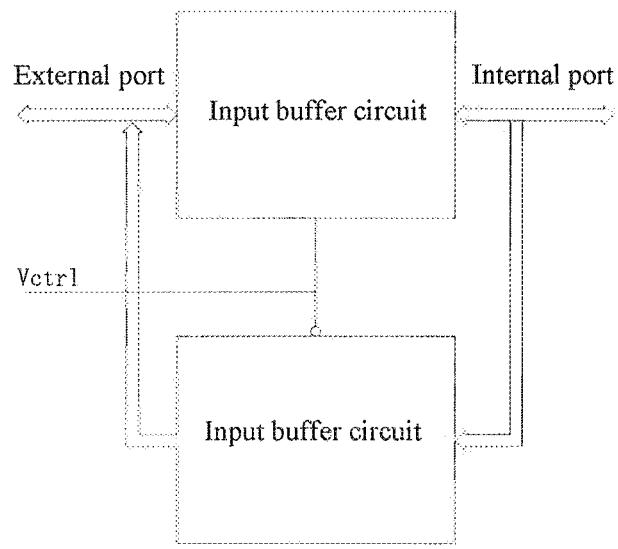
FIG. 3 is an exemplary diagram of a circuit for switching functions of transmission ports VCXA and VCXB.

FIG. 3 shows a typical example of a circuit for switching functions of transmission ports VCXA and VCXB. Through proper settings of a plurality of input buffer circuits and gating switches, an input signal or an output signal may be first buffered in the input buffer circuits, and then, the gating switches select, according to a high level and a low level of logic control signals Vctrl, a port for opening and a port for closing, so as to determine an actual flow of the input signal or the output signal. By using the foregoing circuit design solution, the requirement of switching the functions of the transmission ports VCXA and VCXB is satisfied according to the different logic control signals Vctrl.

It should be noted that the control signal flow mentioned in Embodiment 1 is completely determined according to a position arrangement requirement and a cabling requirement of the entire integrated circuit system on the radio frequency front module. According to a change in a specific requirement of the integrated circuit system, when two identical chips are used, the control signal flow may flexibly change in diversified ways. For example, when more than two integrated circuit chips are cascaded, only a control signal flow on each integrated circuit chip needs to be controlled by using a logic control signal, so that a control signal is output from an output port of a previous-level integrated circuit chip to an input port of a next-level integrated circuit chip, and is transmitted level by level until arriving at an input port of a last-level integrated circuit chip, thereby implementing a cascade serial connection of the integrated circuit chips. In addition, the radio frequency switch chip described in this embodiment is merely an example, and a chip applicable to the present invention is not limited thereto. Other radio frequency amplifier chips, power management chips, or power control chips may all be applied to implement the present invention. They can use the variable signal flow control method provided in the present invention to realize the function of chip reuse, provided that they have similar main functions and merely differ in use cases of respective received and output signal flows.

As can be seen from Embodiment 1, to implement the variable signal flow control method provided in the present invention, at least two completely identical integrated circuit chips need to be used. The integrated circuit chip includes at least two groups of transmission ports. One group of transmission ports are configured as input ports, and the other group of transmission ports are configured as output ports. A signal flow is controlled according to an actual requirement of a system integration hierarchy. A signal flow of the integrated circuit chip is flexibly switched by changing a high level and a low level of the logic control signals while keeping positions of another input port and output port on the integrated circuit chip unchanged. The two integrated circuit chips are defined as a first receiver chip (or referred to as a primary chip) and a second receiver chip (or referred to as a secondary chip) according to a sequence of receiving externally input control signals by the integrated circuit chips. All input port of the first receiver chip is responsible for receiving, a control signal input by the integrated circuit system, and is also responsible for transmitting the received control signal to an input port of another receiver chip. Instead of directly receiving a control signal input by the integrated circuit system, the second receiving chip directly receives an output signal transmitted by an output port of the first receiver chip, as an input signal source. In an embodiment of the present invention, when the integrated circuit chip packaging shown in FIG. 1 is performed, a logic control signal pin of the first receiver chip may be fixedly connected to the power terminal (the VDD terminal) by wire bonding, and a logic control signal pin of the second receiver chip is fixedly connected to the ground terminal (the GND terminal) by wire bonding, or vice versa.

On the other hand, at least one logic control signal is introduced in the variable signal flow control method to define a sequence of the first receiver chip and the second receiver chip. The logic control signal is controlled, so that the integrated circuit chips respectively execute a function of the first receiver chip and a function of the second receiver chip. For example, when the logic control signal is at a high level, the integrated circuit chip controlled by the logic control signal is the first receiver chip (or referred to as the primary chip); and when the logic control signal is at a low level, the integrated circuit chip controlled by the logic control signal is the second receiver chip (or referred to as the secondary chip). Alternatively, when the logic control signal is at a low level, the integrated circuit chip controlled by the logic control signal is the first receiver chip (or referred to as the primary chip); and when the logic control signal is at a high level, the integrated circuit chip controlled by the logic control signal is the second receiver chip (or referred to as the secondary chip).

In addition, the inventor considers that if a part of substrate-level cables are moved to inside of an integrated circuit chip, the cable density of the substrate may further be reduced, thereby effectively reducing inter-cable interference. Therefore, in an embodiment of the present invention, the control signal received by the first receiver chip (or the previous-level integrated circuit chip) is transmitted to another groups of output ports by using cables in the chip, and can further be transferred to the second receiver chip (or the next-level integrated circuit chip) by wire bonding, thereby saving a cable on an external substrate of the chip.

As the system complexity constantly increases, the quantity of control signals also constantly increases. In other embodiments of the present invention, a control signal between the first receiver chip (or the previous-level integrated circuit chip) and the second receiver chip (or the next-level integrated circuit chip) may be transferred by a group of, that is, a plurality of, cables. In this case, the processing manner of moving a part of substrate-level cables to inside of the integrated circuit chip can greatly reduce an area occupied by cables on the substrate, so that the design of the radio frequency front module is more compact and smaller, and signal coupling and interference between cables on the substrate is also reduced.

Figure 4:
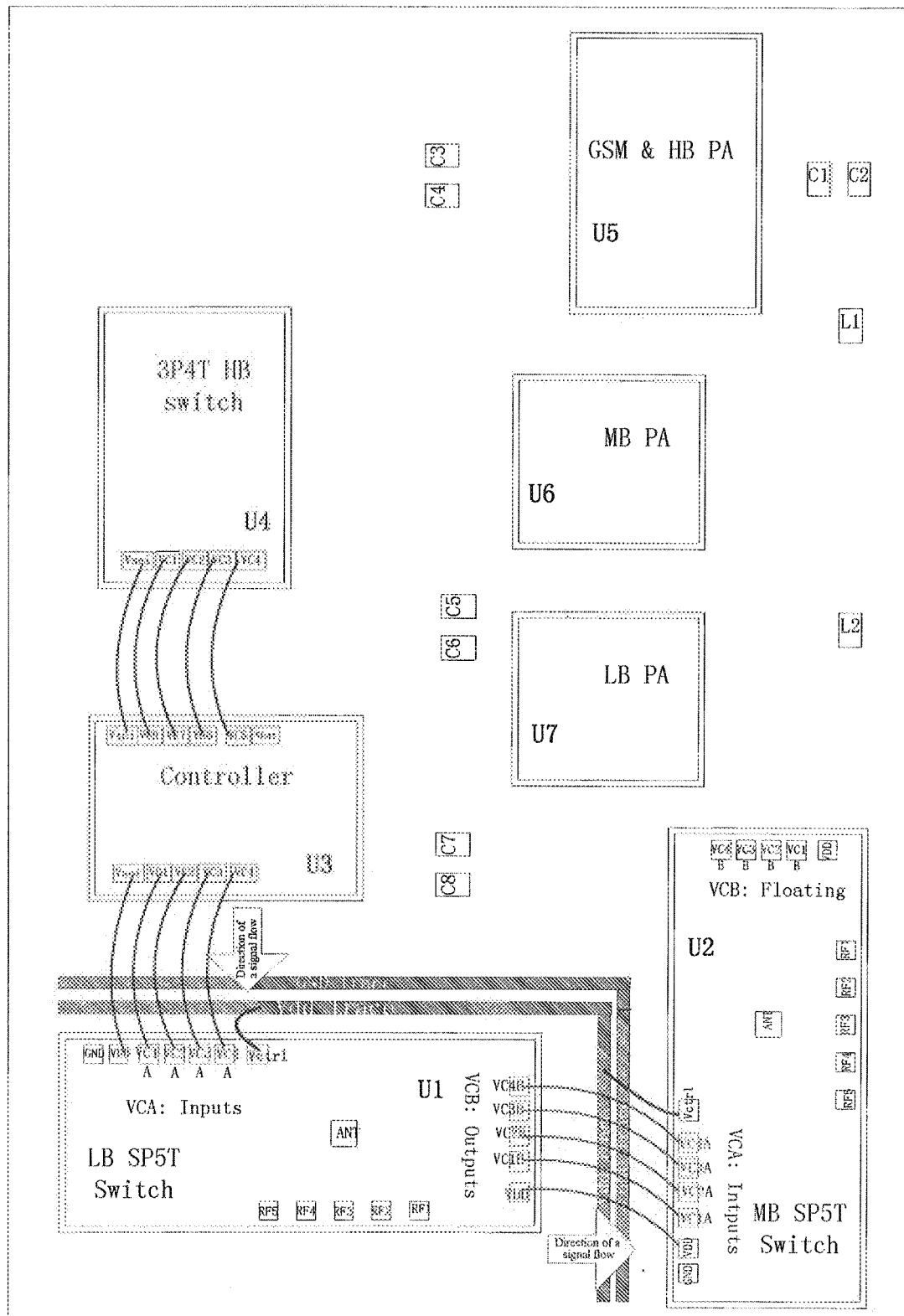
FIG. 4 is a schematic diagram of system integration of Embodiment 1 according to the present invention.

FIG. 4 is a schematic diagram of system integration of the radio frequency switch chip provided in Embodiment 1. As can be seen from FIG. 4, there is a large quantity of chips, and the design complexity is high. For brevity, only a signal connection line related to describing the present invention is drawn. A chip U1 and a chip U2 are two completely identical chips, are both single-pole five-throw radio frequency switch chips, and respectively have routing functions of a low band (LB) radio frequency signal and a middle band (MB) radio frequency signal. U3 is a power supply management and power and switch routing control chip. U4 is a switch routing chip of a high band (HB) radio frequency signal. U5 is a chip of a high band (HB) radio frequency signal and a GSM power amplifier. U6 and U7 are switch routing chips respectively for a middle band (MB) radio frequency signal and a low band (LB) radio frequency signal.

As can be seen from a control signal flow, in this embodiment, the chip U1 is the first receiver chip, and the chip U2 is the second receiver chip. In this case, logic control signals Vctrl of the chip U1 and the chip U2 need to be connected to the power terminal (the VDD terminal), then VCXA are configured as input ports, and VCXB are configured as output ports. A group of control signals are input from the chip U4 to VCXA of the chip U1, and then, the group of signals are connected to the output ports VCXB of the chip by using cables on the chip U1. If needed, output ports VCXB of the chip U2 may be used as input signals of a subsequent serial chip for output. In this case, VCXA of the chip U1 and VCXA of the chip U2 are used as input ports, and VCXB of the chip U1 and VCXB of the chip U2 are used as output ports.

Embodiment 2

Figure 5:
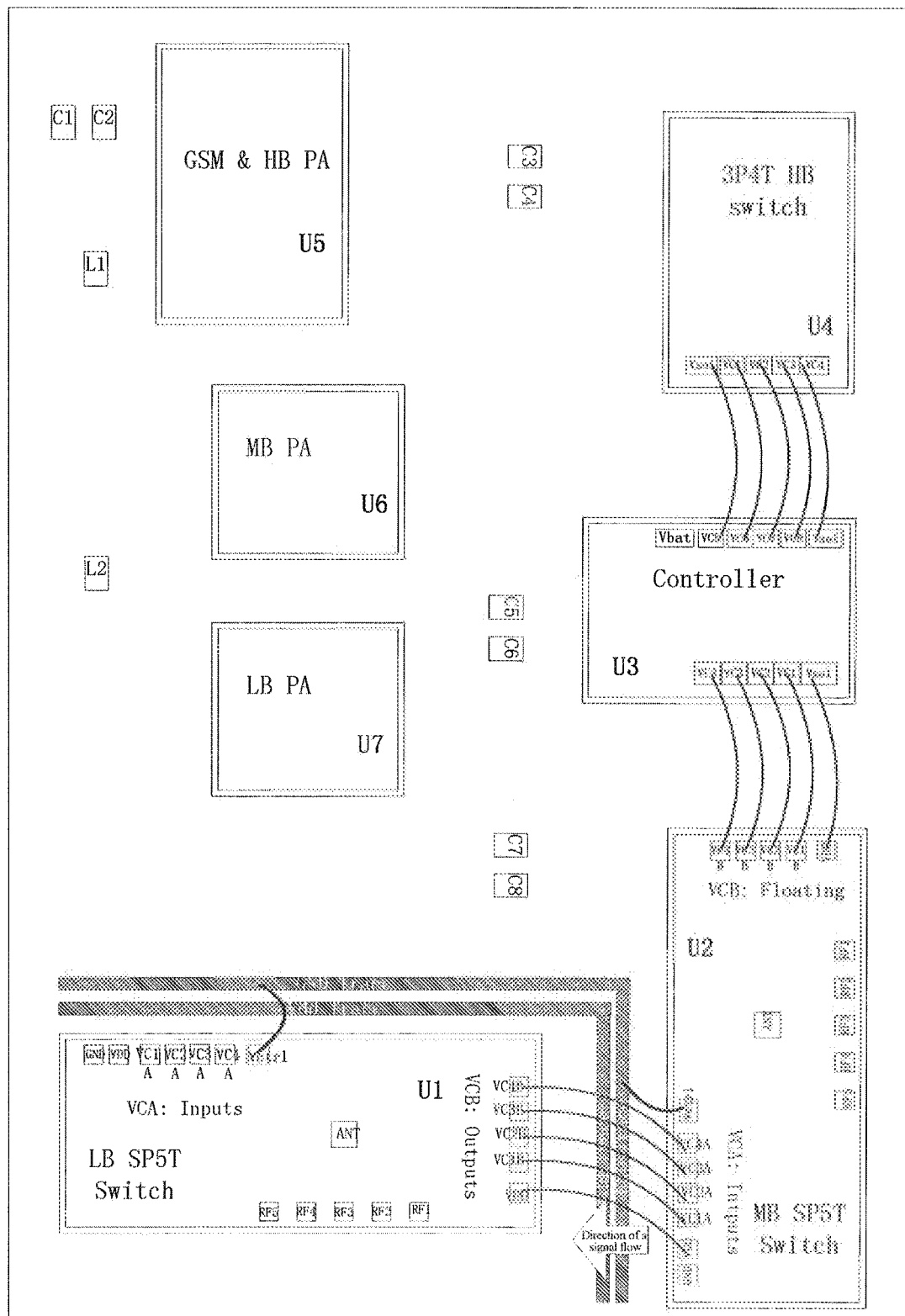
FIG. 5 is a schematic diagram of system integration of Embodiment 2 according to the present invention.

FIG. 5 is a schematic diagram of system integration of the radio frequency switch chip provided in Embodiment 2. Same as Embodiment 1, for brevity, only a signal connection line related to describing the present invention is drawn. Similarly, the functions implemented by chips U1 to U7 are the same as those in Embodiment 1. That is, the U1 chip and the chip U2 are two completely identical chips, are both single-pole five-throw radio frequency switch chips, and respectively have routing functions of a low band (LB) radio frequency signal and a middle band (MB) radio frequency signal. U3 is a power supply management and power and switch routing control chip. U4 is a switch routing chip of a high band (HB) radio frequency signal. U5 is a chip of a high band (HB) radio frequency signal and a GSM power amplifier. U6 and U7 are switch routing chips respectively for a middle band (MB) radio frequency signal and a low band (LB) radio frequency signal.

A difference from Embodiment 1 is that, positions of the chip U3, the chip U4, the chip U5, the chip U6, and the chip U7 are interchanged due to a change in a design requirement of the integrated circuit system, where such a change may include different definition requirements on module pin positions or a requirement that a configured position of an integrated circuit chip needs to be changed to resolve some design problems. As a result, a flow of the entire control signal becomes different. Specifically, a control signal VCX is first output from the chip U3 to the chip U2 rather than to the chip U1 in Embodiment 1. That is, the chip U2 is used as the first receiver chip, and the chip U1 is used as the second receiver chip. In this case, logic control signals Vctrl of the chip U2 and the chip U1 need to be connected to the ground terminal (the GND terminal), so that VCXB are configured as the input ports, and VCXA are configured as the output ports. The same as Embodiment 1, if needed, the output ports VCXA, of the chip U1 may be used as input signals of a subsequent serial chip for output. In this case, VCXA of the chip U1 and VCXA of the chip U2 are used as output ports, and VCXB of the chip U1 and VCXB of the chip U2 are used as input ports.

Embodiment 3

Figure 6:
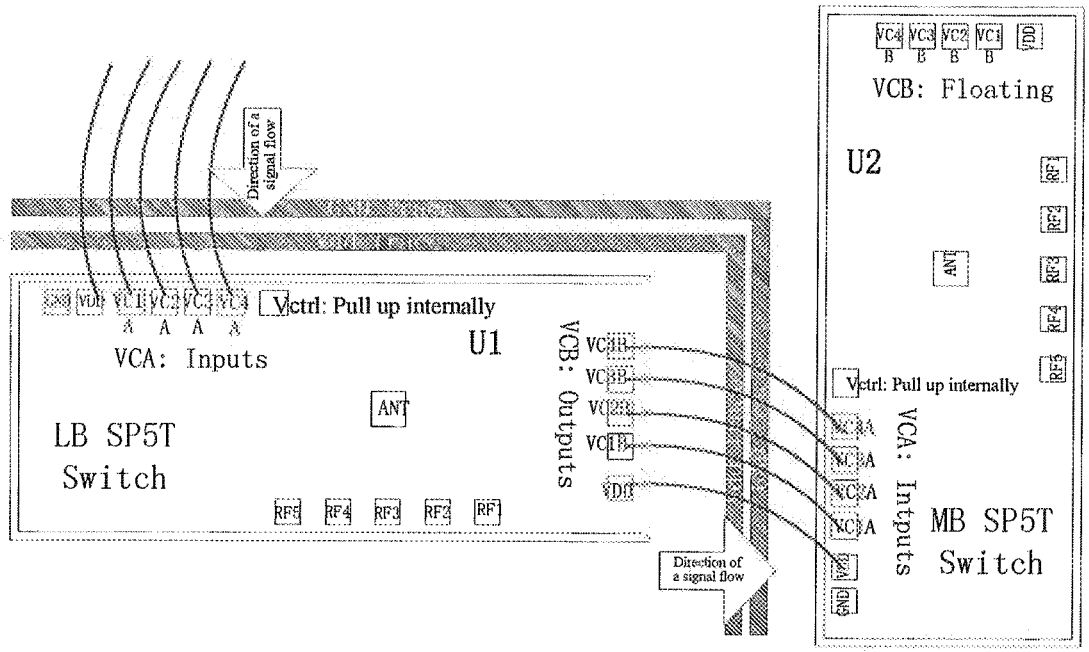
FIG. 6 is a schematic diagram of system integration of Embodiment 3 according to the present invention.

As shown in FIG. 6, in Embodiment 3 of the present invention, at a stage of designing an internal circuit of a chip, an input end of a logic control signal Vctrl of one of two integrated circuit chips is pulled up to a power terminal (a VDD terminal) by using a relatively large resistor, so that the integrated circuit chip may be used as a first receiver chip by default, and correspondingly, VCXA are used as input ports and VCXB are used as output ports by default. When a default signal flow satisfies an application requirement, a Vctrl pin may be unconnected, and does not need to be connected to the power terminal (the VDD terminal) by additional wire bonding, thereby further saving a cable. In an application scenario in which VCXA, need to be configured as output ports, the logic control signal Vctrl may alternatively be connected to a ground terminal (a GND terminal), to configure the integrated circuit chip as a second receiver chip.

It should be noted that the pull-up resistor herein is not limited to a passive thin-film resistor, and may be various types of transistors in a proper biased state. A resistance or an equivalent resistance of the pull-up resistor needs to be eclectically considered. Pulling up intensity needs to be considered to overcome interference. This requires that the pull-up equivalent resistance cannot be too large. In addition, it needs to be considered that when the pull-up control end is connected to the ground terminal (the GND terminal) by external wire bonding, a direct current flowing from the power terminal to the ground terminal through the pull-up resistor cannot be too large. This requires that the pull-up equivalent resistance cannot be too small. A specific value of the direct current may be calculated by using a static power consumption indicator in a system design.

Embodiment 4

Figure 7:
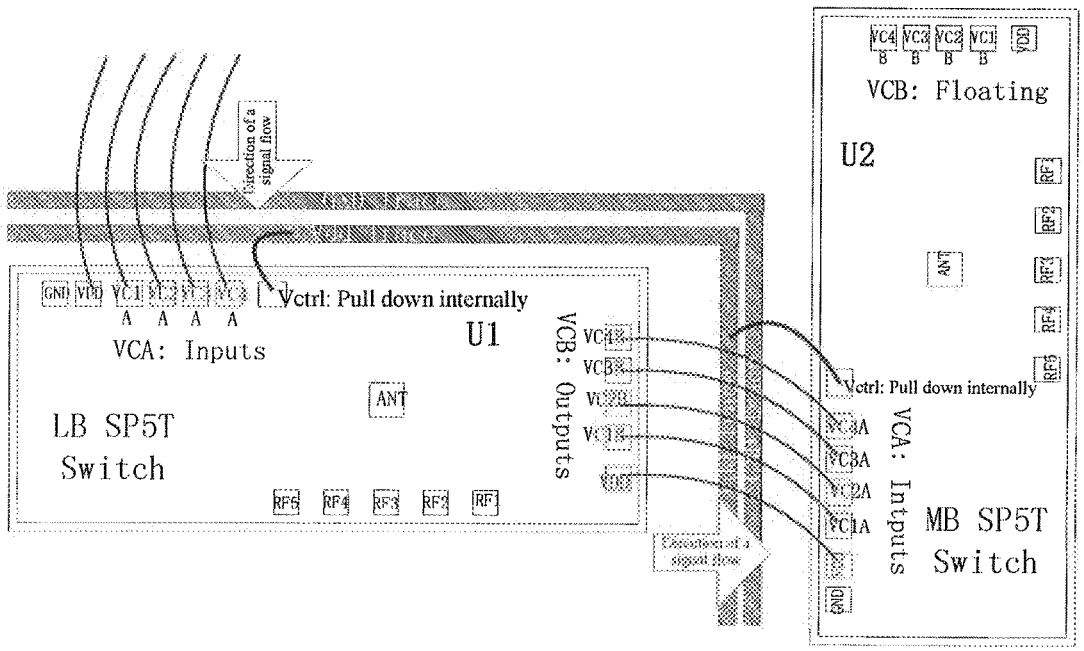
FIG. 7 is a schematic diagram of system integration of Embodiment 4 according to the present invention.

As shown in FIG. 7, in Embodiment 4 of the present invention, an input end of a logic control signal Vctrl of one of two integrated circuit chips is pulled down to a ground terminal (a GND terminal) by using a relatively large resistor, so that the integrated circuit chip may be used as a second receiver chip by default, and correspondingly, VCXA are used as output ports and VCXB are used as input ports by default. When a default signal flow satisfies an application requirement, a Vctrl pin may be unconnected, and does not need to be connected to the ground terminal by additional wire bonding, thereby further saving a cable. In an application scenario in which VCXA need to be configured as input ports, the logic control signal Vctrl may alternatively be connected to a power terminal (a VDD terminal), to configure the integrated circuit chip as a first receiver chip.

It should be noted that the pull-down resistor herein is not limited to a passive thin-film resistor, and may be various types of transistors in a proper biased state. A resistance or an equivalent resistance of the pull-down resistor needs to be eclectically considered. Pulling down intensity needs to be considered to overcome interference. This requires that the pull-down equivalent resistance cannot be too large. In addition, it needs to be considered that when the pull-down control end is connected to the power terminal (the VDD terminal) by external wire bonding, a direct current flowing from the power terminal to the ground terminal through the pull-down resistor cannot be too large. This requires that the pull-down equivalent resistance cannot be too small. A specific value of the direct current may be calculated by using a static power consumption indicator in a system design.

In still another embodiment of the present invention, a communications terminal for realizing chip reuse by using the variable signal flow control method is further provided. The communications terminal refers to computer devices that can be used in a mobile environment and support a plurality of communication standards such as GSM, EDGE, TD-SCDMA, TDD-LTE, and FDD-LTE. The computer devices include mobile phones, notebook computers, tablet computers, and vehicle-mounted computers. In the communications terminal, two completely identical integrated circuit chips are used, and an application effect of switching different signal flows is achieved by using the foregoing variable signal flow control method. That is, one integrated circuit chip is used as a first receiver chip and the other is used as a second receiver chip, and the two can be flexibly switched. Other components of the communications terminal may be implemented by using the prior art and are not specifically described herein.

Compared with the prior art, in the variable signal flow control method provided in the present invention, configuration functions of different input ports and output ports are implemented by using two completely identical integrated circuit chips, thereby further implementing a function of controlling different signal flows. By using the present invention, application flexibility of integrated circuit chips is improved, categories of chips for implementing functions of an integrated circuit system are effectively simplified, and development costs of the integrated circuit system and management complexity of a mass production supply chain are greatly reduced.

The variable signal flow control method for realizing chip reuse and the communications terminal using same that are provided in the present invention are described in detail above. For a person of ordinary skill in the art, any obvious modification made to the present invention without departing from the spirit of the present invention constitutes infringement of the present invention, and shall assume legal responsibility.

What is claimed is:

1. A variable signal flow control method for realizing chip reuse, comprising the following steps:
   when an integrated circuit chip is packaged, logic control signals are connected to a power terminal or a ground terminal of the integrated circuit chip by wire bonding;
   using at least two identical integrated circuit chips, wherein each integrated circuit chip includes at least two groups of transmission ports, one group of transmission ports are configured as input ports, and the other group of transmission ports are configured as output ports; and
   buffering control signals in input buffer circuits, and gating switches selecting, according to the logic control signals, one group of transmission ports for opening and one group of transmission ports for closing, so as to determine different flows of control signals.

2. The variable signal flow control method according to claim 1, wherein
   each integrated circuit chip is any of a radio frequency switch chip, a radio frequency amplifier chip, a power management chip, and a power control chip.

3. The variable signal flow control method according to claim 1, wherein
   when the logic control signals are connected to the power terminal, a first group of transmission ports are used as input ports, and a second group of transmission ports are used as output ports; and
   when the logic control signals are connected to the ground terminal, the first group of transmission ports are used as output ports, and the second group of transmission ports are used as input ports.

4. The variable signal flow control method according to claim 3, wherein
   when the at least two integrated circuit chips are connected in series level by level, the logic control signals are controlled, so that the control signals are output from an output port of a previous-level integrated circuit chip to an input port of a next-level integrated circuit chip.

5. The variable signal flow control method according to claim 4, wherein
   the previous-level integrated circuit chip transmits the received control signals to the output port by using a cable inside a chip, and transfers the received control signals to the next-level integrated circuit chip by wire bonding, thereby saving a cable on an external substrate of the chip.

6. The variable signal flow control method according to claim 1, wherein
   there are two integrated circuit chips, the integrated circuit chip receiving the control signals first is a first receiver chip, and the integrated circuit chip receiving the control signals later is a second receiver chip; and
   the first receiver chip transmits the received control signals to an input port of the second receiver chip.

7. The variable signal flow control method according to claim 6, wherein
   the logic control signals are controlled, so that the integrated circuit chips respectively execute a function of the first receiver chip and a function of the second receiver chip.

8. The variable signal flow control method according to claim 1, wherein
   in each integrated circuit chip, an input end of the logic control signals is pulled up to a power terminal by using a resistor, and a pin of the logic control signals is unconnected.

9. The variable signal flow control method according to claim 8, wherein
   the resistor is a passive thin-film resistor or a transistor in a proper biased state.

10. The variable signal flow control method according to claim 1, wherein
    in each integrated circuit chip, an input end of the logic control signals is pulled down to a ground terminal by using a resistor, and a pin of the logic control signals is unconnected.

11. The variable signal flow control method according to claim 10, wherein
    the resistor is a passive thin-film resistor or a transistor in a proper biased state.

12. A communications terminal, wherein in the communications terminal, at least two identical integrated circuit chips are used, and different flows of control signals are achieved by using the variable signal flow control method according to claim 1.

* * * * *